ND TRANSALKYLATION DISPROPORTION-
ATION OF AROMATICS
Stephen M. Kovach, Highland, Ind., and Glenn O.
Michaels, Park Forest, Ill., assignors to Sinclair Research, Inc., Wilmington, Del., a corporation of Delaware
No Drawing. Filed Mar. 8, 1962, Ser. No. 178,269
9 Claims. (Cl. 260—672)

This invention relates to the treatment of alkyl-aromatic hydrocarbons and is particularly concerned with a catalytic process for the transalkylation-disproportionation-isomerization process of polyalkyl aromatics, e.g. polyalkyl benzenes, employing a hydrocarbon conversion catalyst consisting of a promoted, acidic predominantly silica-based cracking catalyst.

Alkyl aromatics, such as alkyl benzenes are used by the chemical industry as intermediates in the preparation of resins, plastics and diverse chemicals such as aldehydes, alcohols, carboxylic acids, etc. For instance, durene (1,2,4,5-tetramethylbenzene) is a chemical which is of particular utility as an intermediate in preparing various plastics, resins, synthetic filaments and other products. Also, the lower molecular weight symmetrical 1,3,5-trialkylbenzenes are highly desired for oxidation to aromatic polycarboxylic acids which are useful in the production of alkyd type resins, plastics and plasticizers. The symmetrical 1,3,5-trimethylbenzene (mesitylene) has an extremely high clear CFR-R octane number. Its blending octane number is among the highest of any pure hydrocarbon tested in contrast with other known blending aromatics such as cumene and the ortho-, meta-, and paraxylenes.

A number of reactions of the alkyl benzene molecule may be effected. The alkyl substituents may be shifted along the benzene ring, i.e. transalkylation; or the alkyl substituent may be shifted from one alkyl benzene molecule to another, i.e. disproportionation; or interaction of alkyl benzenes, for instance, the dealkylation of some molecules with further alkylation of others.

The use of catalysts for the transalkylation-disproportionation of low molecular weight polyalkylbenzenes has long been known and many catalysts have been suggested for these processes. In such processes, the catalyst usually suffered from a defect either of being insufficiently active to promote the transalkylation-disproportionation reaction or if sufficiently active, of too short a life to be of commercial interest. Silica-alumina catalysts have been previously suggested for the transalkylation-disproportionation reaction and while they are very good with respect to yield, they too have a very short life and require frequent regeneration because of the high production of coke which becomes deposited on the catalyst. The presence of hydrogen reduces carbon laydown on the catalyst but not sufficient to increase catalyst activity appreciably. In a short period, i.e. about 4 to 8 hours, transmethylation activities decrease rapidly.

In accordance with the present invention, it has been found that when employing an acidic predominantly silica-based active catalytic support promoted with chromium oxide or chromium oxide in admixture with zinc oxide and copper oxide and hydrogen as a diluent, carbon laydown on the catalyst is reduced to such an extent that catalyst activity can be maintained for a period ranging from about 1 to 3 days or longer.

Transalkylation-disproportionation-isomerization is accomplished in the present process by employing particularly effective catalyst which includes a silica-containing base and a promoter selected from the group consisting of chromium oxide and chromium oxide in admixture with zinc oxide and copper oxide in catalytic amounts of at least about 20 weight percent or more, preferably about 30 to 40 weight percent of the total catalyst weight. When chromium is the sole essential metal oxide promoter at least about 25 or more weight percent on a silica containing base is generally employed. When the oxide of chromium is used in combination with the oxides zinc and copper, it is present in amounts in the range of about 1 to 38, preferably about 5 to 20 weight percent. The zinc oxide is generally present in amounts in the range of about 1 to 38, preferably about 5 to 20; copper oxide in amounts in the range of about 1 to 38, preferably 5 to 20 weight percent. When the oxides of zinc, copper and chromium are used as the promoting metals the ratio of zinc to copper to chromium can be varied to predominance in any one or more of the metal oxides.

The silica-containing base is an acidic predominantly silica-based active catalytic support such as silica-alumina, silica-magnesia, silica-alumina-zirconia composites and the like; however, silica-alumina is preferred and a synthetic gel silica-alumina is preferred among the silica-aluminas. The silica-alumina base generally includes a minor amount of alumina, for instance about 1 to 40, preferably about 10 to 25 weight percent alumina. The silica content of the catalyst support is predominant, i.e. silica is preferably present in amounts from about 50 to 90 weight percent. The base can also include minor amounts, for instance, from about 1 to 20 weight percent, of other ingredients such as promoters, particularly acidic promoters. Thus, the catalyst base can contain halogen, e.g. chloride or fluorine usually in amounts of from about 0.1 to 3 percent by weight. Acidic promoters, include for example, metal oxides such as magnesia and boria, the total of such promoters generally not exceeding about 10 percent by weight, for instance, about 0.1 to 5 weight percent.

Chromia, employed in amounts greater than about 25 weight percent, is unique in that under the conditions employed very little, if any, aromatic nuclei undergo hydrogenation due to the presence of excess hydrogen with the result that less naphthenes are formed which then undergo hydrocracking, decreasing overall product yield. When the oxides of chromium, zinc and copper are employed as the active promoters for the silica-containing base in the presence of hydrogen, carbon laydown on the catalyst is decreased to a value such that the cycle life of the catalyst is extended while at the same time maintaining disproportionation-isomerization activity.

The catalyst used in the process of the present invention can be prepared by known procedures involving impregnating the support, for instance silica-alumina, with water soluble salts of the catalytic components or by coprecipitation. The support can be impregnated with the active oxides simultaneously or singly in order. The metal oxides can be added to the catalyst in any stage of its preparation. They may be incorporated on the support either before or after the addition of the chromium oxide. They can be added to the catalyst after the support has been formed by tabletting or extrusion and calcined. Suitable water-soluble chromium compounds include chromium nitrate, chromic acid, chromic sulfate and chromium chloride. Suitable water-soluble zinc compounds include zinc acetate, zinc bromate, zinc bromide, zinc chlorate, zinc chloride, zinc dichromate, zinc fluogallate, zinc iodide, zinc nitrate, zinc picrate and zinc sulfate. Suitable water-soluble copper salts include cupric acetate, cupric bromate, cupric bromide, cupric chlorate, cupric chloride, cupric dichromate, cupric lactate, cupric nitrate, cupric salicylate and cupric sulfate.

When employing the impregnation procedure, after impregnation the resulting impregnated product is dried generally at a temperature within the range of 170° to 400° F. for at least 6 hours and up to 24 hours or more with a slow stream of air circulated to carry off the water vapor. The dried silica-alumina catalyst mixture may then be formed by a tableing of extruding operation. If the catalyst is to be in finely divided form, a grinding operation may follow drying. In the case of tabletting it is customary to incorporate a die lubricant which advantageously is organic and can be burned out by oxidation in the calcination step.

The dried pellets are suitable for subjection to high temperature treatment or calcination at a temperature between about 500° F. and about 1500° F., for instance for a period of between about 2 and about 36 hours. It is generally preferred that the calcining operation be conducted in a manner minimizing contact time of the silica-alumina containing product with water vapor at the high temperature encountered. The product, after drying, generally contains a substantial amount of water which is driven off at temperatures above about 400° F. It is usually preferred to heat the silica-alumina containing composite at a rate of 2 to 20° F. per minute up to about 600° F. with an air flow through the catalyst bed followed by heating at a slower rate to the final calcination temperature within the range of about 700° F. to 1500° F. especially if an organic die lubricant is to be oxidized without localized overheating. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The silica-alumina impregnated with the catalytically active components, is finally cooled to yield the finished product.

The catalyst employed in the process of the present invention can be easily regenerated employing conventional procedures, for instance by subjecting it to an oxygen containing gas at temperatures sufficient to burn off carbon deposited on the catalyst during the transalkylation-disproportionation reaction. This oxygen-containing gas, e.g. an oxygen-nitrogen mixture, can contain about 0.01 weight percent oxygen and is introduced at a flow rate such that the maximum temperature at the site of combustion is below about 1000° F.

The feed to the instant process comprises complex mixtures which include any polyalkylated mono- and polycyclic aromatic hydrocarbons such as xylenes, trimethyl-, tetramethyl-pentamethyl- and hexamethyl benzenes, polyethyl benzenes, ethyl toluenes and ethyl xylenes, polypropyl and polybutyl benzenes as well as the analogous polynuclear derivatives such as polymethyl naphthalenes, e.g. dimethylnaphthalene, and anthracenes. These compounds may correspond to the general formula:

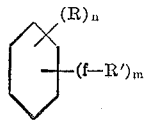

where R is an alkyl, including cyclo alkyl, radical containing generally from about 1 to 20, preferably from about 1 to 8 carbon atoms and where $n$ is 2 or more, R need not be the same alkyl group; $n$ is 2 to 6; R' is an aromatic hydrocarbon ring, preferably $C_4H_4$; —f— indicates a fused ring relationship (two carbon atoms common to two aromatic nuclei, e.g. as in naphthalene); and $m$ is generally 0 to 1 or more. The preferred aromatics, however, include alkyl benzenes corresponding to the above formula when $m$ is 0. Benzene and toluene may be present in the feed material but for economic reasons, they are usually excluded from the feed.

The aromatic rings and R groups may be substituted as with phenyl, hydroxy, alkoxy, halide and other radicals which do not prevent the desired reaction. Suitable aromatic hydrocarbons include ortho-xylene, meta-xylene, para-xylene, ortho-ethyltoluene, meta-ethyltoluene, para-ethyltoluene, 1,2,3-trimethyl benzene, 1,2,4-trimethylbenzene, 1,3,5-trimethylbenzene or mesitylene. Higher molecular weight alkyl-aromatic hydrocarbons are also suitable as starting materials and include aromatic hydrocarbons such as are produced by the alkylation of aromatic hydrocarbons with olefin polymers. Such products are frequently referred to in the art as alkylate, and include hexyltoluene, nonyltoluene, dodecyltoluene, pentadecyltoluene, etc. Preferably the feedstock of the present invention should be a polymethylbenzene feedstock which is preferably substantially free from olefinic components.

In accordance with this invention the feedstock containing the desired polyalkyl aromatic components, along with added hydrogen in the amount of hydrogen to polyalkyl aromatic feed in the mole ratios of from 1 to about 20:1 or more, preferably from about 1 to 10:1, is contacted with the chromia-silica-alumina catalyst or the zinc oxide-copper oxide-chromia-silica-alumina catalyst at temperatures between about 300 to 1000° F., preferably about 400 to 800° F. while the pressure may range from about ambient pressure or less up to about 2000 p.s.i.g., preferably from about 0 to 1000 p.s.i.g. The catalyst can be used as a fixed, moving or fluidized bed or in any other convenient type of handling system. The aromatic space velocity will in most cases be from about 0.01 to 20, preferably from about 0.1 to 10, weights of aromatic per weight of catalyst per hour (WHSV).

The following examples will serve to illustrate the invention but they are not to be considered as limiting:

EXAMPLE I 2 moles of ortho-xylene and 1 mole of pentamethylbenzene were charged to a reactor from a graduated blowcase by nitrogen displacement. Both the diluent gas and the liquid feed were metered to the reactor through Fisher-Porter rotameters.

On leaving the reaction zone the effluent stream is first freed of hydrogen and similar light gases and is thereafter subjected to one or more distillation operations to recover a fraction rich in 1,3,5-trimethylbenzene produced in the transmethylation-disproportionation reaction as well as a fraction rich in isomers of tetramethylbenzene which may be further treated to recover durene (1,2,4,5-tetramethylbenzene) for instance, by introducing the $C_{10}$ fraction into a crystallization unit and subjecting the feed stream, by the use of coolants, to a temperature sufficiently low to effect crystallization of a substantial portion of the durene, e.g. temperatures in the range of about —20° F., the crystals formed are separated from the mother liquid and the crystals may be further treated to obtain a durene product of high purity. The volume of dry gas was measured by means of a wet test meter and spot and continuous gas samples were taken. The gas samples were analyzed by mass spectrometer techniques. Total hydrocarbon analyses were by a vapor phase chromatography. Example I was conducted under the conditions specified in Table I. Also, Table I gives a comparison of silica-alumina, chromia-silica-alumina and zinc oxide-copper oxide-chromia-silica-alumina and the effect of hydrogen as a diluent on the transmethylation-disproportionation-isomerization reaction.

Table I

| Run No. | 1 | 2 | 3 | 4 | 5 |
|---|---|---|---|---|---|
| Catalyst | Houdry | SiO₂-Al₂O₃ | 32% Cr₂O₃ on SiO₂-Al₂O₃ | | 10% ZnO-5% CuO-5% Cr₂O₃ on SiO₂-Al₂O₃ |
| Time, Hours | 4 | 4 | 24 | 24 | |
| Conditions: | | | | | |
| Temp., °F | 700 | 700 | 700 | 700 | 700 |
| Pressure, p.s.i.g | 100 | 200 | 100 | 150 | 500 |
| Diluent/Arom | None | H₂-3/1 | None | H₂-3/1 | H₂-7/1 |
| WHSV | 0.25 | 0.25 | 0.25 | 0.25 | 0.34 |
| Percent of Theory: | | | | | |
| Disproportionation | 95 | 96 | 91 | 95 | 95 |
| Isomerization to C₉ (1,3,5-TMB) | 111 | 114 | 79 | 102 | 100 |
| Carbon on Cat., Wt. Percent | 1.9 | 1.3 | 3.7 | 0.7 | Nil |

The conventional silica-alumina cracking catalyst has excellent properties for the transmethylation-disproportionation of the high molecular weight alkylbenzenes to the lower molecular weight homologues, but the result is obtained with a high coking rate (Run 1). Employing hydrogen as a diluent with the conventional silica-alumina catalyst reduced carbon laydown on the catalyst but was not sufficient to increase catalyst activity appreciably (Run 2). This necessitates frequent regeneration at about six-hour intervals even though disproportionation and transmethylation have not dropped to a low level. However, when a high percentage of chromia is incorporated upon an active silica-alumina support and the reaction conducted in the presence of hydrogen (Run 4) high disproportionation and transmethylation are maintained and a low coking rate is obtained. This lower coking rate enhances the aging characteristics of the catalyst. Run 3 is presented to show the necessity of the presence of hydrogen in order to maintain disproportionation and transmethylation and decrease the coking on the catalyst. The improvement obtained in Run 5, using a zinc oxide-copper oxide-chromia-silica-alumina catalyst is quite apparent. Isomerization-disproportionation activity is maintained and carbon laydown has been decreased to a value approaching zero (carbon present, but not measurable, a value less than 0.5 g. CO₂ for a 200 g. charge of catalyst).

What is claimed is:

1. A process for treating polyalkyl aromatics which comprises treating a polyalkyl aromatic feedstock under transmethylation and disproportionation conditions at a temperature between about 400 to 800° F. and at a pressure between about 0 to 1000 p.s.i.g. in the presence of free hydrogen, the mole ratio of hydrogen to polyalkyl aromatic feed being about 1:1 to about 10:1, and of a catalyst consisting essentially of about 1 to 38 weight percent chromia, 1 to 38 weight percent zinc oxide, and about 1 to 38 percent copper oxide on a synthetic gel silica-alumina support, with the proviso that the total amount of chromium, zinc oxide and copper oxide is about 20 to 40 weight percent of the catalyst.

2. The process of claim 1 wherein the polyalkyl aromatic corresponds to the structural formula

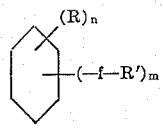

where R is an alkyl radical containing from about 1 to 20 carbon atoms; $n$ is 2 to 6; R' is an aromatic hydrocarbon ring, $m$ is 0 to 1 and —f— indicates a fused ring relationship.

3. The process of claim 2 wherein the polyalkyl aromatic feedstock comprises a mixture of polymethylbenzenes of more than 10 carbon atoms and less than 10 carbon atoms.

4. The process of claim 3 wherein the polyalkyl aromatic feedstock comprises a mixture of pentamethylbenzene and orthoxylene.

5. A process for treating polyalkyl aromatics which comprises contacting a polyalkyl aromatic feedstock under transmethylation and disproportionation conditions at a temperature between about 300 to 1000° F. in the presence of free hydrogen and of a catalyst consisting essentially of about 1 to 38 weight percent chromia, about 1 to 38 weight percent zinc oxide, and about 1 to 38 percent copper oxide on a silica-containing base, with the proviso that the total amount of chromium, zinc oxide and copper oxide is about 20–40 weight percent of the catalyst.

6. The process of claim 4 wherein the silica-containing base is a synthetic gel, silica-alumina support.

7. The process of claim 5 wherein the polyalkyl aromatic corresponds to the structural formula

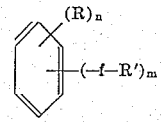

where R is an alkyl radical containing from about 1 to 20 carbon atoms; $n$ is 2–6; R' is an aromatic hydrocarbon ring; $m$ is 0–1 and —f— indicates a fused ring relationship.

8. The process of claim 7 wherein the polyalkyl aromatic feedstock comprises a mixture of polymethyl benzene of more than 10 carbon atoms and less than 10 carbon atoms.

9. The process of claim 8 wherein the polyalkyl aromatic feedstock comprises a mixture of pentamethylbenzene and orthoxylene.

References Cited by the Examiner
UNITED STATES PATENTS

| 1,809,978 | 6/1931 | Larson | 252—458 |
| 2,242,488 | 5/1941 | Thacker | 252—458 |
| 2,389,445 | 11/1945 | Mattox et al. | 260—672 |
| 2,523,686 | 9/1950 | Engel | 252—458 |

DELBERT E. GANTZ, *Primary Examiner.*

ALPHONSO D. SULLIVAN, *Examiner.*